(12) United States Patent
Kochi (10) Patent No.: US 7,221,397 B1  
(45) Date of Patent: May 22, 2007

(54) PHOTOELECTRIC CONVERSION APPARATUS WHICH AVOIDS CERTAIN SHADING EFFECTS

(75) Inventor: Tetsunobu Kochi, Hiratsuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/161,294

(22) Filed: Sep. 28, 1998

(30) Foreign Application Priority Data

Sep. 29, 1997  (JP) ............................... 9-263546

(51) Int. Cl.  
*H04N 3/14* (2006.01)

(52) U.S. Cl. ...................... 348/310; 348/301; 348/308; 250/208.1

(58) Field of Classification Search ............. 250/208.1, 250/214 R; 348/294, 297, 300, 301, 302–304, 348/307–310; *H04N 3/14, 5/335*  
See application file for complete search history.

(56) References Cited

U.S. PATENT DOCUMENTS

| | | | | |
|---|---|---|---|---|
| 4,466,018 A | * | 8/1984 | Soneda ...................... | 348/300 |
| 4,996,413 A | * | 2/1991 | McDaniel et al. ........ | 250/208.1 |
| 5,536,932 A | * | 7/1996 | Hack .......................... | 348/303 |
| 5,698,844 A | | 12/1997 | Shinohara et al. ....... | 250/214 R |
| 5,719,626 A | * | 2/1998 | Yoneyama ................. | 348/301 |
| 5,856,686 A | * | 1/1999 | Watanabe .................. | 257/291 |
| 5,942,774 A | * | 8/1999 | Isogai ........................ | 257/292 |
| 5,952,659 A | * | 9/1999 | Yoneyama ................. | 250/332 |
| 5,998,818 A | * | 12/1999 | Kumagai ................... | 257/291 |
| 6,049,357 A | * | 4/2000 | Shinohara ................. | 348/307 |
| 6,061,093 A | * | 5/2000 | Yonemoto ................. | 348/305 |
| 6,449,014 B1 | * | 9/2002 | Throngnumchai ......... | 348/304 |
| 6,512,543 B1 | * | 1/2003 | Kuroda et al. ............ | 348/302 |
| 6,670,990 B1 | * | 12/2003 | Kochi et al. ............... | 348/310 |

FOREIGN PATENT DOCUMENTS

| | | | |
|---|---|---|---|
| EP | 0 757 497 A2 | * | 7/1996 |
| JP | 04-010569 | | 1/1992 |
| JP | 04-010569 A | | 1/1992 |
| JP | 9-51480 | | 2/1997 |
| JP | 9-51480 A | | 2/1997 |
| JP | 10-233964 | * | 9/1998 |

OTHER PUBLICATIONS

Patent Abstracts of Japan, vol. 1998, No. 14, Dec. 13, 1998, JP 10 233964 A (Abstract).*

* cited by examiner

*Primary Examiner*—David Ometz  
*Assistant Examiner*—Luong T. Nguyen  
(74) *Attorney, Agent, or Firm*—Fitzpatrick, Cella, Harper & Scinto

(57) ABSTRACT

In order to solve the problem in which voltages Vsig1 read in units of rows have differences to cause vertical shading, thereby degrading image quality, and the problem in which the dynamic ranges of source follower circuits are different in units of rows because finite resistances are distributed in the power supply lines, a photoelectric conversion apparatus includes photoelectric conversion portions placed in a plurality of rows, an amplification section including a load section arranged in units of vertical output lines to amplify signal charges accumulated in the photoelectric conversion portions placed in a plurality of rows, a vertical scanning section for sequentially scanning signals amplified by the amplification section to read the signals onto the vertical output lines, and a horizontal scanning section for sequentially scanning the signals amplified by the amplification section to read the signals onto horizontal output lines, wherein the load sections are located on a side vertically opposite to the direction of signal output from the amplification section.

5 Claims, 8 Drawing Sheets

PHOTOELECTRIC CONVERSION APPARATUS WHICH AVOIDS CERTAIN SHADING EFFECTS

BACKGROUND OF THE INVENTION

1. Field of the Invention

The present invention relates to a photoelectric conversion apparatus having photoelectric conversion elements arrayed in a matrix and being capable of obtaining a high-quality image.

2. Related Background Art

Figure 1:
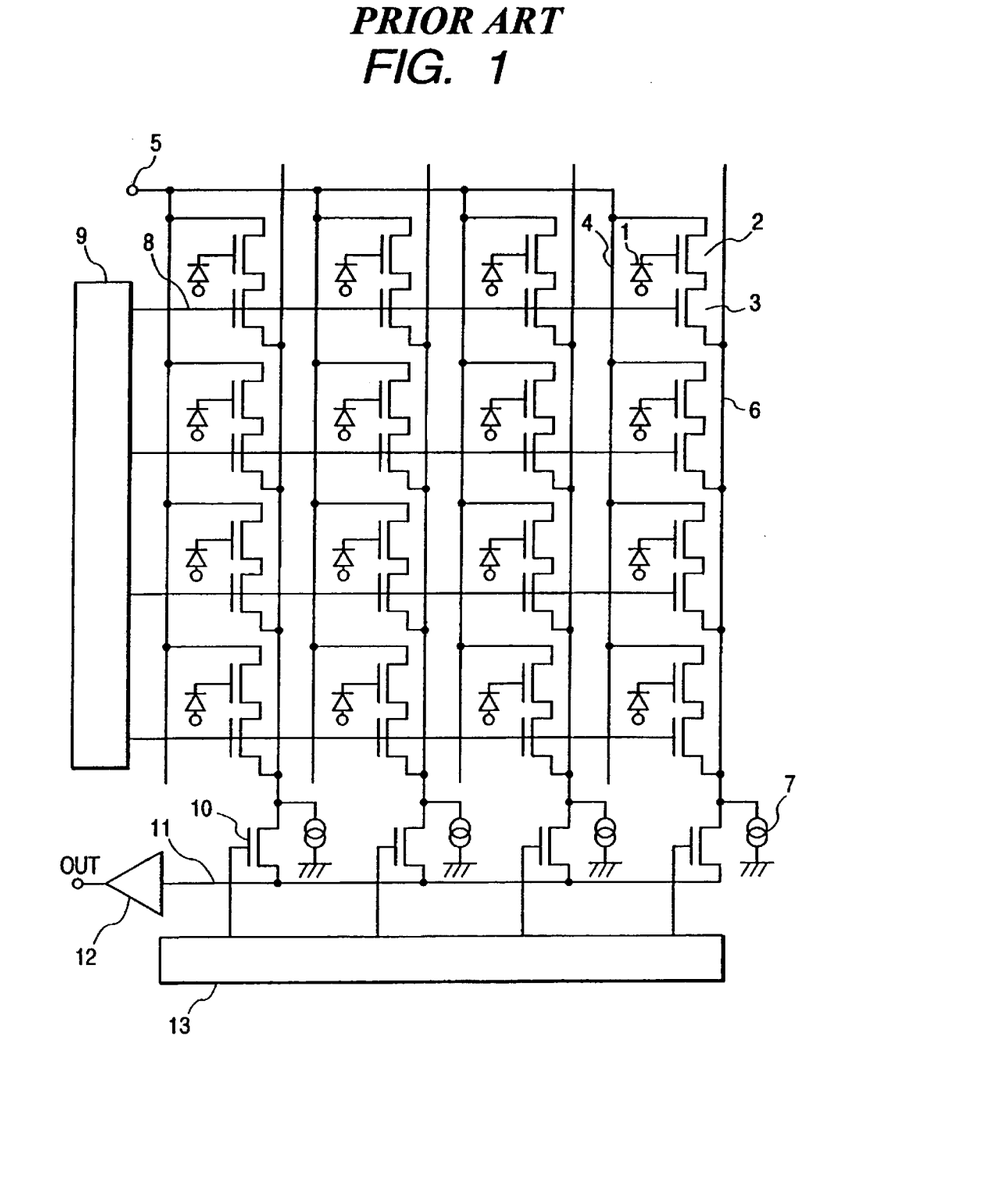
FIG. 1 is a diagram for explaining a conventional photoelectric conversion apparatus.

FIG. 1 is a diagram for explaining a conventional photoelectric conversion apparatus. Referring to FIG. 1, photoelectric conversion elements (e.g., photodiodes) 1 store charges in accordance with the amounts of incident light and form a two-dimensional array (4×4 elements in FIG. 1). One terminal of the photoelectric conversion element 1 is connected to the gate of a source follower input MOS 2. The source of the source follower input MOS 2 is connected to the drain of a vertical selection switch MOS 3. The drain of the source follower input MOS 2 is connected to a power supply terminal 5 through a power supply line 4. The source of the vertical selection switch MOS 3 is connected to a load power supply 7 through a vertical output line 6. The source follower input MOS 2, the vertical selection switch MOS 3, and load power supply 7 form a source follower circuit. The photoelectric conversion element 1, the source follower input MOS 2, the vertical selection switch MOS 3, and load power supply 7 form a pixel.

A signal voltage of the photoelectric conversion element 1 is induced at the gate of the source follower input MOS 2 in accordance with the charge accumulated in the photoelectric conversion element of each pixel. This signal voltage is current-amplified and read by the source follower circuit.

The gate of the vertical selection switch MOS 3 is connected to a vertical scanning circuit 9 via a vertical gate line 8. An output signal from the source follower circuit is externally output via the vertical output line 6, a horizontal transfer MOS switch 10, a horizontal output line 11, and an output amplifier 12. The gate of each horizontal transfer MOS switch 10 is connected to a horizontal scanning circuit 13. With this arrangement, the signal voltages of the respective photoelectric conversion elements sequentially turn on the vertical selection switch MOSs 3 by the pulse voltages on the vertical gate lines 8 connected to the vertical scanning circuit 9. The signal voltages are read onto the corresponding vertical lines. The horizontal transfer MOS switches 10 are sequentially turned on by a shift register signal of the horizontal scanning circuit 13. The signal voltages of the respective photoelectric conversion elements are output from the output amplifier 12 as time-serial signals in units of pixels.

Figure 2:
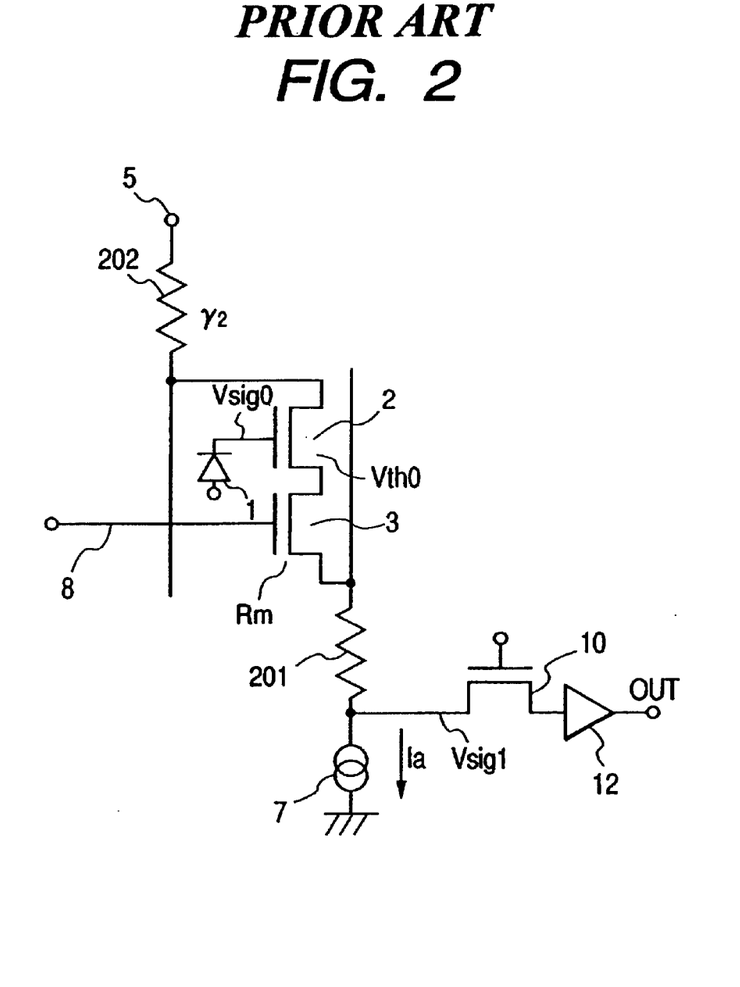
FIG. 2 is a circuit diagram for explaining the operation of the conventional photoelectric conversion apparatus.

In the prior art described above, since finite resistances are distributed in the vertical output lines 6, shading in the vertical direction occurs in the signals due to potential drops across the resistances. For descriptive convenience, one pixel and its peripheral portion are illustrated in FIG. 2. Referring to FIG. 2, a resistance 201 is distributed on the vertical output line 6. Let M rows of pixels be present, and r1 be the resistance value of the vertical output line per row. Then, the total resistance between the pixels on the Kth row and the horizontal transfer MOS switch 10 is defined as:

$$r1 \times K (1 \leq K \leq M) \quad (1)$$

Let Ia, Rm, Vth0, and Vsig0 be the current flowing through the load power supply 7, the series resistance of the vertical selection switch MOSs 3, the threshold voltage of the source follower input MOS 2, and the signal voltage on the gate of the source follower input MOS 2, respectively. Then, a signal Vsig1 current-amplified and read by the source follower circuit is defined as:

$$Vsig1 = Vsig0 - Vth0 - Ia \times Rm - Ia \times r1 \times K (1 \leq K > M) \quad (2)$$

That is, even if the identical signal voltages Vsig0 is induced at the pixels, the voltages Vsig1 read in units of rows have differences due to voltage drops by the resistances r1 of the vertical output lines 6, thus causing vertical shading. The image quality is greatly deteriorated.

In recent years, the number of pixels increases and the size decreases in the development of photoelectric conversion apparatus. The wirings used in the photoelectric conversion apparatus tend to be thin and long. Voltage drop by the resistance r1 of the vertical output line 6 poses a serious problem.

Figure 8:
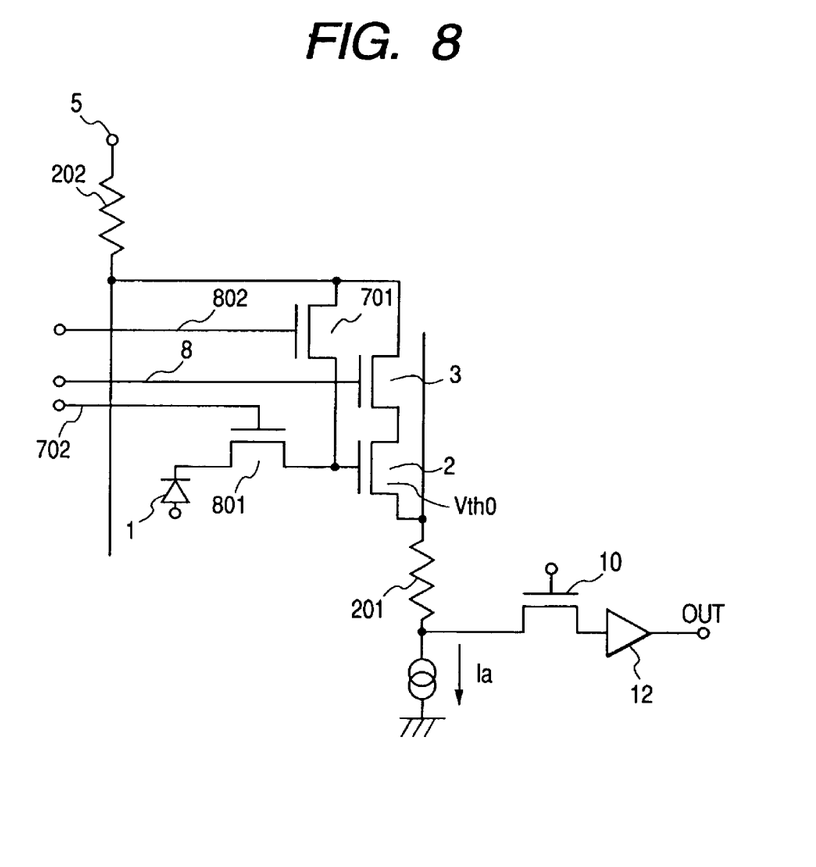
FIG. 8 is a diagram for explaining the fifth embodiment of the present invention.

Another problem is posed by different dynamic ranges of the source follower circuit in units of rows because a finite resistance is distributed on the power supply line 4. This problem will be described with reference to FIG. 2. A resistance 202 in FIG. 8 is distributed on the power supply line 4. Let M rows of pixels be present, and r2 be the resistance value of the power supply line per row. Then, the total resistance between the pixels on the Kth row and the power supply terminal 5 is:

$$r2 \times K (1 \leq K \leq M) \quad (3)$$

Letting Vd be the voltage of the power supply terminal 5, the source follower input MOS 2 must operate as a pentode in order to operate the source follower circuit as a linear amplifier. A condition for this is given by:

$$Vd - Ia \times r2 \times K > Vsig0 - Vth0 (1 \leq K \leq M) \quad (4)$$

The above condition can be rewritten as:

$$Vsig0 < Vd + Vth0 - Ia \times r2 \times K (1 \leq K \leq M) \quad (5)$$

The signal voltage values not satisfying the above condition are different depending on the rows. That is, the signals have different dynamic ranges.

This results in saturation voltage shading or output shading on the small-light-amount characteristic side due to a combination with the polarities of the photodiode 1, thereby greatly degrading the image quality.

SUMMARY OF THE INVENTION

It is an object of the present invention to prevent degradation of image quality in a photoelectric conversion apparatus.

In order to achieve the above object, according to the first embodiment, there is provided a photoelectric conversion apparatus comprising photoelectric conversion elements mounted on a plurality of rows, amplification means, including load means arranged in units of vertical output lines, for amplifying signal charges accumulated in the photoelectric conversion elements mounted in the plurality of rows, vertical scanning means for sequentially scanning signals amplified by the amplification means to read the signals onto the vertical output lines, and horizontal scanning means for sequentially scanning the signals amplified by the amplification means to read the signals onto horizontal output lines, wherein the load means are located on a side vertically opposite to a direction of signal output from the amplification means.

According to another embodiment, there is provided a photoelectric conversion apparatus comprising photoelectric conversion elements mounted on a plurality of rows, amplification means, including load means arranged in units of vertical output lines, for amplifying signal charges accumulated in the photoelectric conversion elements mounted in the plurality of rows, vertical scanning means for sequentially scanning signals amplified by the amplification means to read the signals onto the vertical output lines, and horizontal scanning means for sequentially scanning the signals amplified by the amplification means to read the signals onto horizontal output lines, wherein the load means are located on vertically the same side as a direction of outputting the signals from the amplification means, and some of the signals from the amplification means are output in an opposite direction to the direction of signal output.

According to still another embodiment, there is provided a photoelectric conversion apparatus comprising photoelectric conversion elements mounted on a plurality of rows, amplification means for amplifying signal charges accumulated in the photoelectric conversion elements mounted in the plurality of rows, vertical scanning means for sequentially scanning signals amplified by the amplification means to read the signals onto the vertical output lines, horizontal scanning means for sequentially scanning the signals amplified by the amplification means to read the signals onto horizontal output lines, and power supply means for supplying power supply voltages to the amplification means, wherein one of the power supply means is located on a side vertically opposite to a direction of signal output from the amplification means.

According to still another embodiment of the present invention, there is provided a photoelectric conversion apparatus comprising photoelectric conversion elements mounted on a plurality of rows, output means for outputting as voltage signals signal charges accumulated in the photoelectric conversion elements mounted on the plurality of rows, vertical scanning means for sequentially scanning the voltage signals from the output means to read the voltage signals onto vertical output lines, horizontal output means for sequentially scanning the voltage signals on the vertical output lines to read the voltage signals onto horizontal output lines, and shading correction means for correcting shading resulting from a voltage signal level difference between the photoelectric conversion elements on different rows, which is output from the output means.

With the above arrangements, a high-quality photoelectric conversion apparatus can be provided.

The above and other objects, features, and advantages of the present invention will be apparent from the detailed description of the preferred embodiments taken in conjunction with the accompanying drawings.

DESCRIPTION OF THE PREFERRED EMBODIMENTS

Figure 3:
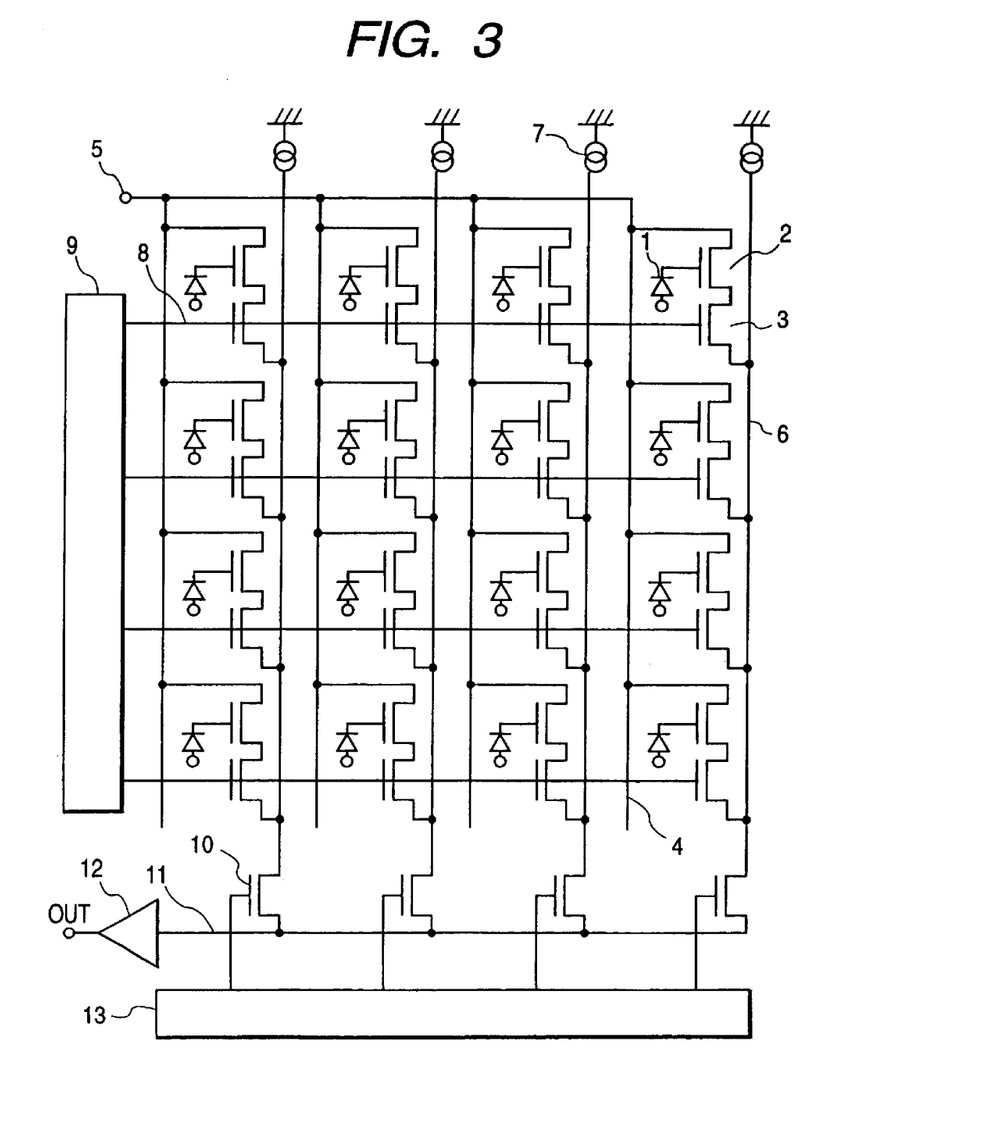
FIG. 3 is a diagram for explaining the operation of the first embodiment of the present invention.

FIG. 3 is a diagram for explaining the first embodiment of the present invention. Constant current sources 7 are located on the side vertically opposite to the direction of outputting signal voltages from a source follower circuit. Referring to FIG. 3, photoelectric conversion elements (e.g., photodiodes) 1 store charges in accordance with the amounts of incident light and form a two-dimensional array (4×4 elements in FIG. 3). One terminal of the photoelectric conversion element 1 is connected to the gate of a source follower input MOS 2. The source of the source follower input MOS 2 is connected to the drain of a vertical selection switch MOS 3. The drain of the source follower input MOS 2 is connected to a power supply terminal 5 through a power supply line 4. The source of the vertical selection switch MOS 3 is connected to a load power supply 7 through a vertical output line 6. The source follower input MOS 2, the vertical selection switch MOS 3, and load power supply 7 form a source follower circuit. The photoelectric conversion element 1, the source follower input MOS 2, the vertical selection switch MOS 3, and load power supply 7 form a pixel.

A signal voltage of the photoelectric conversion element 1 is induced at the gate of the source follower input MOS 2 in accordance with the charge accumulated in the photoelectric conversion element of each pixel. This signal voltage is current-amplified and read by the source follower circuit.

The gate of the vertical selection switch MOS 3 is connected to a vertical scanning circuit 9 via a vertical gate line 8. An output signal from the source follower circuit is externally output via the vertical output line 6, a horizontal transfer MOS switch 10, a horizontal output line 11, and an output amplifier 12. The gate of each horizontal transfer MOS switch 10 is connected to a horizontal scanning circuit 13. With this arrangement, the signal voltages of the respective photoelectric conversion elements sequentially turn on the vertical selection switch MOSs 3 by the pulse voltages on the vertical gate lines 8 connected to the vertical scanning circuit 9. The signal voltages are read onto the corresponding vertical lines. The horizontal transfer MOS switches 10 are sequentially turned on by a shift register signal of the horizontal scanning circuit 13. The signal voltages of the respective photoelectric conversion elements are output from the output amplifier 12 as time-serial signals in units of pixels. An amplifier such as a MOS amplifier having a high input impedance is preferable as the output amplifier 12.

Figure 4:
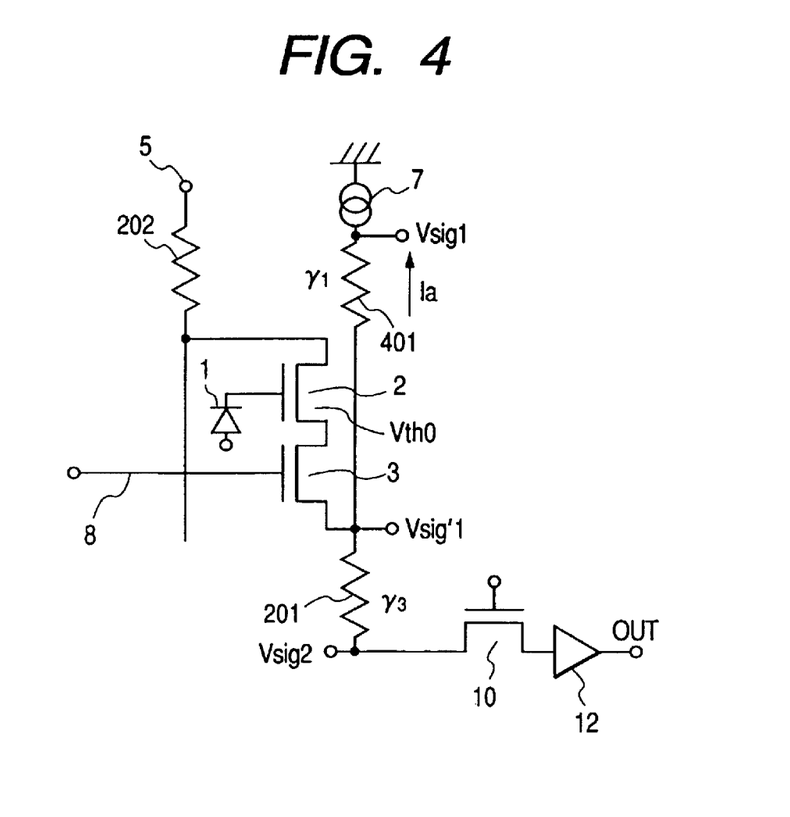
FIG. 4 is a circuit diagram for explaining the operation of the first embodiment of the present invention.

FIG. 4 shows one pixel and its peripheral portion for illustrative convenience. Referring to FIG. 4, a resistance 401 is present between the source follower and the constant current source 7. A steady current of the constant current source 7 flows into the constant current source 7 via this resistance 401. A resistance 201 is present between the source follower and the output terminal.

A voltage Vsig1' at the output terminal of the source follower is given by:

$$Vsig1'=Vsig0-Vth0-Ia \times Rm \quad (6)$$

This value is a constant value which is determined by the design values of the transistor and the steady current.

As previously described, the steady current Ia flows into the constant current source 7 via the resistance 401, and the voltages Vsig1 at the connection points between the constant current sources 7 and the resistances 401 have potential differences in units of pixel rows due to the presence of the resistances 401, as indicated by equation (2) above.

The load power supplies 7 are located on the side vertically opposite to the direction of outputting the signal voltages from the source follower circuits.

Hence, only a transient current in the initial read period flows across the resistance 201, and no steady current flows across it. A voltage Vsig2 at the connection point between the resistance 201 and the horizontal transfer MOS switch 10 is given by:

$$Vsig2=Vsig1' \quad (7)$$

No potential effect occurs by resistance. Therefore, vertical shading can be greatly reduced, and image quality can be improved.

In this embodiment, the source follower circuit using a constant current type load has been described above. The present invention, however, is not limited to this. The same effect as described can be obtained by using a resistance type circuit. This also holds true for the use of an inverting amplifier type circuit which is not a source follower circuit but a circuit for inverting and amplifying the charges accumulated in a photoelectric conversion element and outputting the charges onto a vertical output line, as disclosed in U.S. Pat. No. 5,698,844.

In addition, the same effect can be also obtained even when a signal is stored temporarily in a capacity and then read out therefrom, instead of being input into the amplifier directly.

In this embodiment, the shading correction means is an arrangement in which the constant current sources 7 are located on the side vertically opposite to the direction of outputting the signal voltages from the source follower circuits. This arrangement has a function of correcting shading arising from level differences of signals output from the source follower circuits of the respective rows.

In this embodiment, the current output means is an arrangement in which the constant current sources 7 are located on the side vertically opposite to the direction of outputting the signal voltages from the source follower circuits.

The above arrangement has a function of flowing currents on the vertical output lines to the constant current source side but not in the direction in which signals are output from the source follower circuits.

Figure 5:
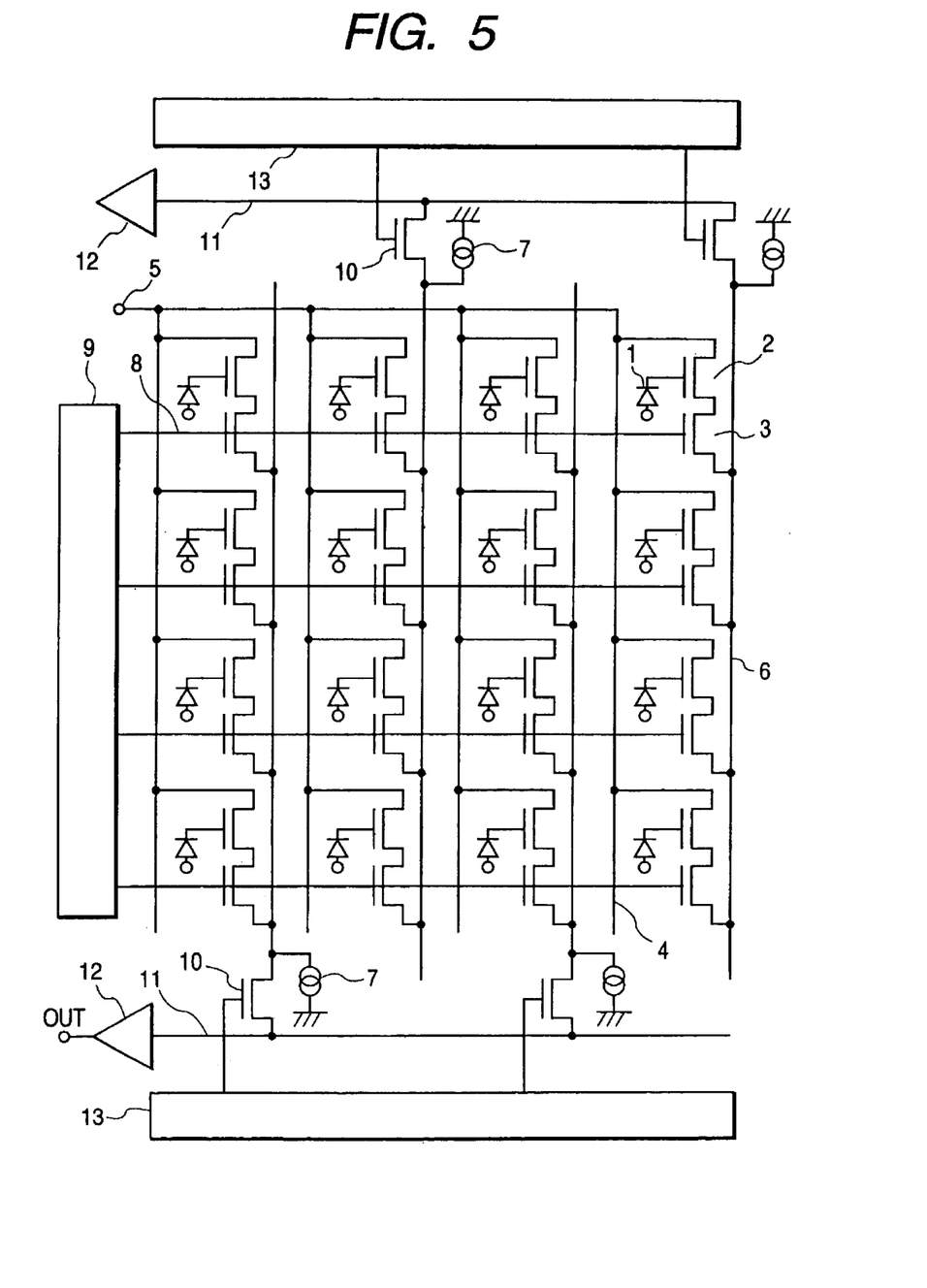
FIG. 5 is a diagram for explaining the second embodiment of the present invention.

FIG. 5 is a chart for explaining the second embodiment of the present invention. Constant current sources are located on vertically the same side as a direction of outputting signal voltages from source follower circuits, and at the same time, the signal voltages in units of rows are alternately output in opposite directions.

Referring to FIG. 5, photoelectric conversion elements (e.g., photodiodes) 1 store charges in accordance with the amounts of incident light and form a two-dimensional array (4×4 elements in FIG. 5). One terminal of the photoelectric conversion element 1 is connected to the gate of a source follower input MOS 2. The source of the source follower input MOS 2 is connected to the drain of a vertical selection switch MOS 3. The drain of the source follower input MOS 2 is connected to a power supply terminal 5 through a power supply line 4. The source of the vertical selection switch MOS 3 is connected to a load power supply 7 through a vertical output line 6. The source follower input MOS 2, the vertical selection switch MOS 3, and load power supply 7 form a source follower circuit. The photoelectric conversion element 1, the source follower input MOS 2, the vertical selection switch MOS 3, and load power supply 7 form a pixel.

A signal voltage of the photoelectric conversion element 1 is induces at the gate of the source follower input MOS 2 in accordance with the charge accumulated in the photoelectric conversion element of each pixel. This signal voltage is current-amplified and read by the source follower circuit.

The gate of the vertical selection switch MOS 3 is connected to a vertical scanning circuit 9 via a vertical gate line 8. An output signal from the source follower circuit is externally output via the vertical output line 6, a horizontal transfer MOS switch 10, a horizontal output line 11, and an output amplifier 12. The gate of each horizontal transfer MOS switch 10 is connected to a horizontal scanning circuit 13. With this arrangement, the signal voltages of the respective photoelectric conversion elements sequentially turn on the vertical selection switch MOSs 3 by the pulse voltages on the vertical gate lines 8 connected to the vertical scanning circuit 9. The signal voltages are read onto the corresponding vertical lines. The horizontal transfer MOS switches 10 are sequentially turned on by a shift register signal of the horizontal scanning circuit 13. The signal voltages of the respective photoelectric conversion elements are output from the output amplifier 12 as time-serial signals in units of pixels.

The horizontal transfer MOS switches 10 are connected to every other vertical output lines 6, and each horizontal scanning circuit 13 outputs a signal from the corresponding horizontal transfer MOS switch 10 to the corresponding horizontal output line 11 for each vertical output line 6. The constant current sources 7 serving as the loads of the source follower circuits are connected to the sources of the horizontal transfer MOS switches 10 on the vertical output line 6 side. The resistance values of the vertical output lines are different depending on the locations of the vertical gate lines 8. The horizontal scanning circuits 13 are arranged on the two terminals of each vertical output line 6. The horizontal scanning circuits 13 on the two terminals synchronously operate to turn on each horizontal transfer MOS switch 10 in units of vertical output lines 6. Each horizontal scanning circuit 13 reads an optical charge signal from the photoelectric conversion element 1 to the corresponding horizontal output line 11, thereby outputting the signal from the corresponding output amplifier 12. In this case, the horizontal transfer MOS switches 10 at the two terminals are turned on to increase the read rate.

Although not shown, the output signals from the output amplifiers 12 at the two terminals may be concatenated as a time-serial image signal sequence and output as a video signal via a sample/hold circuit, a shading correction circuit, and the like.

With the above arrangement, assume a photoelectric conversion apparatus having elements at M rows and N columns. A signal voltage read from a pixel at the Kth row and Lth column ($1 \leq K \leq M$, $1 \leq L \leq N$) is given by:

$$VsigKL=Vsig0-Vth0-Ia \times Rm-Ia \times r1 \times K (1 \leq K \leq M) \quad (8)$$

(where Rm is the series ON resistance value of the vertical selection switch MOSs 3, r1 is the resistance value of the vertical output line 6 per row, Vsig0 is the output voltage of the photoelectric conversion element 1, Vth0 is the threshold voltage of the source follower input MOS 2, and Ia is the current of the constant current source 7). A signal voltage read from a pixel at the Kth row and (L+1)th column ($1 \leq K \leq M$, $1 \leq L \leq N$) is influenced by a different resistance value because the voltage extraction direction is reversed, and becomes:

$$VsigKL+1 = Vsig0 - Vth0 - Ia \times Rm - Rm - Ia \times r1 \times (M-K) \quad (1 \leq K \leq M) \quad (9)$$

As can be apparent from the above equation, for example, when odd-numbered columns are taken into consideration, shading has occurred in this embodiment as in the conventional case, but shading opposite to that of the odd-numbered columns has occurred in even-numbered columns, thereby averaging and canceling shading and hence greatly improving the image quality.

In practice, a relevant external circuit can be mounted outside or inside the device to add or average adjacent signals to further reduce shading. In a photoelectric conversion apparatus for sensing a color image using color filters of, e.g., complementary colors, processing for adding and reading adjacent signals is generally performed by adding and reading signals of adjacent pixels, and reconstructing a video signal by external matrix operations. In this case, the use of the arrangement of the present invention allows reduction in shading without causing any trouble.

This embodiment has exemplified a case in which constant current sources are alternately connected to the columns. The constant current sources may be connected to every two or three columns, depending on the degree of shading, to obtain the same effect as described above. Alternatively, constant current sources may be alternately connected to the columns at only the central portion of the light-receiving section of a photoelectric conversion apparatus.

In this embodiment, a source follower circuit using a constant current load has been described. However, the present invention is not limited to this. The same effect as in this embodiment can be obtained with the use of a resistance type load. This also holds true for the use of an inverting amplifier type circuit which is not a source follower circuit but a circuit for inverting and amplifying the charges accumulated in a photoelectric conversion element and outputting the charges onto a vertical output line, as disclosed in U.S. Pat. No. 5,698,844.

In addition, the same effect can be also obtained even when a signal is stored temporarily in a capacity and then read out therefrom, instead of being input into the amplifier directly.

In this embodiment, the shading correction means is an arrangement in which the constant current sources 7 are located on vertically the same side as the direction of outputting the signal voltages from the source follower circuits, and at the same time, the signal voltages in units of rows are alternately output in opposite directions. This arrangement has a function of correcting shading resulting form level differences of signals output from the source follower circuits of the respective rows.

In this embodiment, the current output means is an arrangement in which the constant current sources 7 are located on the side vertically opposite to the direction of outputting the signal voltages from the source follower circuits, and at the same time, the signal voltages in units of rows are alternately output in opposite directions. In this arrangement, the level differences of voltage signals, between different rows, that are output from the source follower circuits are alternately opposite to each other.

Figure 6:
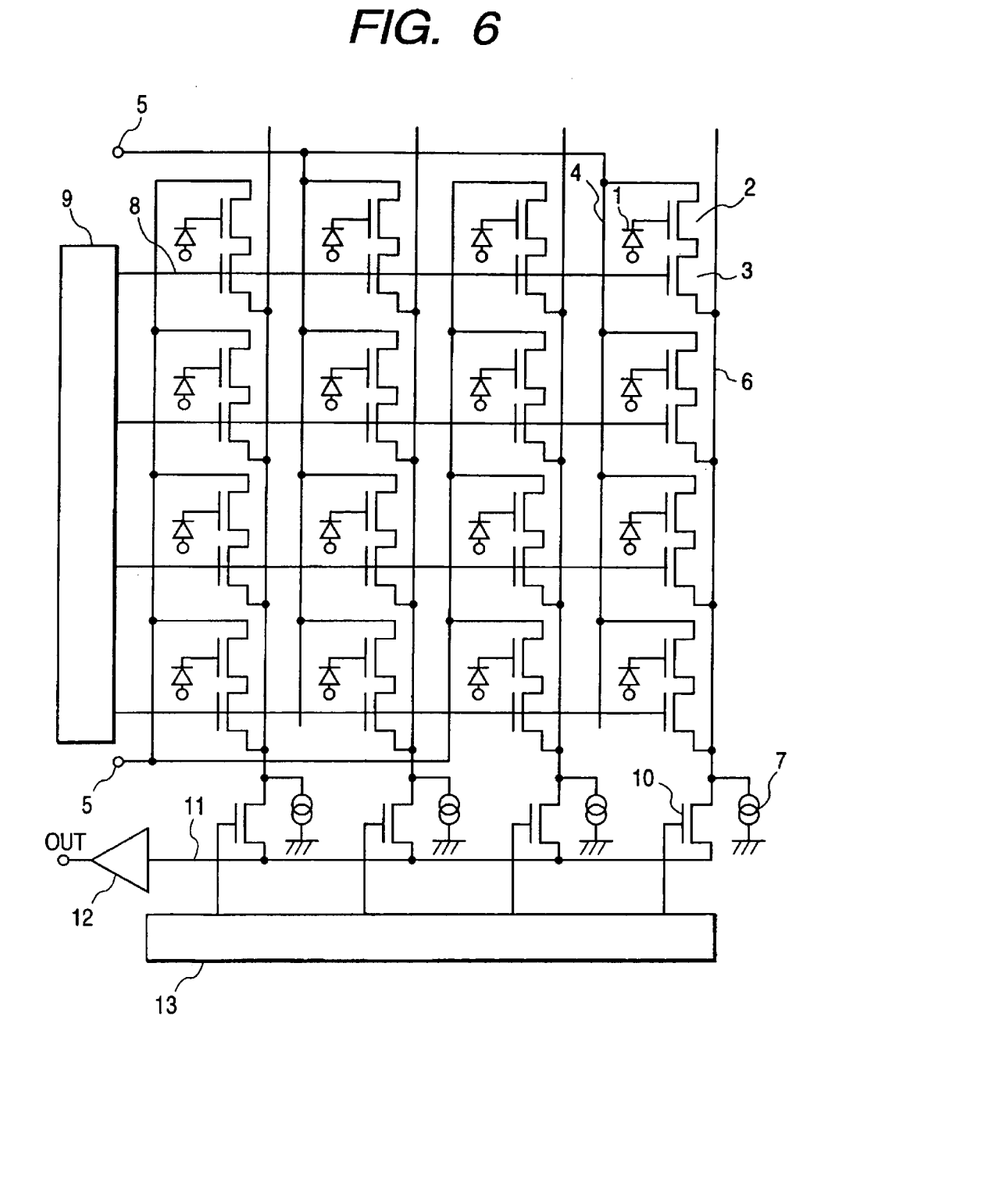
FIG. 6 is a diagram for explaining the third embodiment of the present invention.

FIG. 6 is a diagram for explaining the third embodiment of the present invention. The power supply terminals of source follower circuits are alternately arranged at vertically opposite positions.

Referring to FIG. 6, photoelectric conversion elements (e.g., photodiodes) 1 store charges in accordance with the amounts of incident light and form a two-dimensional array (4×4 elements in FIG. 6). One terminal of the photoelectric conversion element 1 is connected to the gate of a source follower input MOS 2. The source of the source follower input MOS 2 is connected to the drain of a vertical selection switch MOS 3. The drain of the source follower input MOS 2 is connected to a power supply terminal 5 through a power supply line 4. The source of the vertical selection switch MOS 3 is connected to a load power supply 7 through a vertical output line 6. The source follower input MOS 2, the vertical selection switch MOS 3, and load power supply 7 form a source follower circuit. The photoelectric conversion element 1, the source follower input MOS 2, the vertical selection switch MOS 3, and load power supply 7 form a pixel.

A signal voltage of the photoelectric conversion element 1 is induced at the gate of the source follower input MOS 2 in accordance with the charge accumulated in the photoelectric conversion element of each pixel. This signal voltage is current-amplified and read by the source follower circuit. The power supplies of the respective source follower circuits are connected to the power supply lines 4 in units of rows. The power supply lines 4 are alternately connected to the power supply terminals 5.

The gate of the vertical selection switch MOS 3 is connected to a vertical scanning circuit 9 via a vertical gate line 8. An output signal from the source follower circuit is externally output via the vertical output line 6, a horizontal transfer MOS switch 10, a horizontal output line 11, and an output amplifier 12. The gate of each horizontal transfer MOS switch 10 is connected to a horizontal scanning circuit 13. With this arrangement, the signal voltages of the respective photoelectric conversion elements sequentially turn on the vertical selection switch MOSs 3 by the pulse voltages on the vertical gate lines 8 connected to the vertical scanning circuit 9. The signal voltages are read onto the corresponding vertical lines. The horizontal transfer MOS switches 10 are sequentially turned on by a shift register signal of the horizontal scanning circuit 13. The signal voltages of the respective photoelectric conversion elements are output from the output amplifier 12 as time-serial signals in units of pixels.

With the above arrangement, the dynamic range of a signal read from a pixel at the Kth row and Lth column ($1 \leq K \leq M$, $1 \leq L \leq N$) falls within the range:

$$VsigKL < Vd + Vth0 - Ia \times r2 \times K \quad (1 \leq K \leq M) \quad (10)$$

(where Vd is the power supply voltage, Vth0 is the threshold voltage of the source follower input MOS 2, and r2 is the resistance value between the drain of the source follower input MOS 2 corresponding to each vertical gate line 8 of the power supply line 4 and the drain of the source follower input MOS 2 corresponding to the next vertical gate line 8). At this time, the dynamic range of a signal read from a pixel at the Kth row and (L+1)th row ($1 \leq K \leq M$, $1 \leq L \leq N$) is:

$$VsigKL < Vd + Vth0 - Ia \times r2 \times (M-K) \quad (1 \leq K \leq M) \quad (11)$$

As is apparent from the above condition, for example, when odd-numbered columns are taken into consideration, shading of the saturation voltage of the photoelectric conversion characteristics of the photoelectric conversion element 1 or small-light-amount side output shading has occurred in this embodiment as in the conventional case, but shading opposite to that of the odd-numbered columns has occurred in even-numbered columns, thereby averaging and canceling shading and hence greatly improving the image quality.

This embodiment has exemplified a case in which constant current sources are alternately connected to the columns. The constant current sources may be connected to every two or three columns, depending on the degree of shading, to obtain the same effect as described above. Alternatively, constant current sources may be alternately connected to the columns at only the central portion of the light-receiving section of a photoelectric conversion apparatus.

In this embodiment, a source follower circuit using a constant current load has been described. However, the present invention is not limited to this. The same effect as in this embodiment can be obtained with the use of a resistance type load. This also holds true for the use of an inverting amplifier type circuit which is not a source follower circuit but a circuit for inverting and amplifying the charges accumulated in a photoelectric conversion element and outputting the charges onto a vertical output line, as disclosed in U.S. Pat. No. 5,698,844.

In addition, the same effect can be also obtained even when a signal is stored temporarily in a capacity and then read out therefrom, instead of being input into the amplifier directly.

In this embodiment, the shading correction means is an arrangement in which the power supply terminals 5 of the source follower circuits are alternately located in the vertically opposite directions of columns. This arrangement has a function of correcting shading resulting from level differences of signals output from the source follower circuits of the respective rows.

In this embodiment, the power supply voltage supply means is an arrangement in which the power supply terminals 5 of the source follower circuits are alternately located in the vertically opposite directions of columns. This arrangement has a function of alternately reversing the directions of vertically reducing the power supply voltage supply amounts in units of columns in order to output signal voltages from the source follower circuits.

When a current read type amplifier is used, a new effect, i.e., reduction in output current shading can be obtained.

Figure 7:
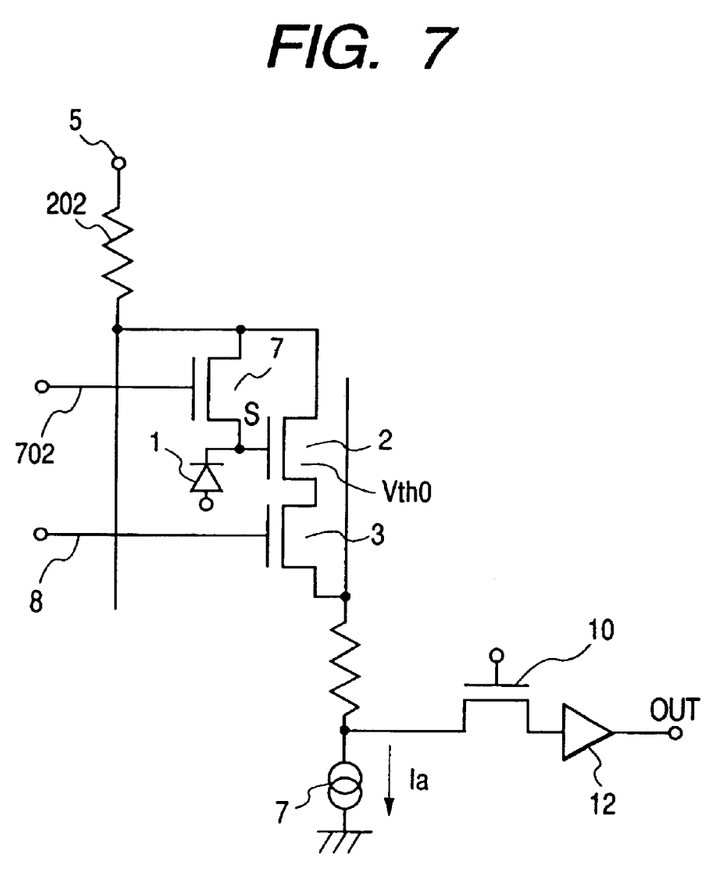
FIG. 7 is a diagram for explaining the fourth embodiment of the present invention.

FIG. 7 is a diagram for explaining the fourth embodiment of the present invention. Referring to FIG. 7, a reset switch 701 removes the charge accumulated in a photoelectric conversion element 1. The source of the reset switch 701 is connected to the photoelectric conversion element 1, and the drain of the reset switch 701 is connected to a power supply line 4 common to the source follower circuit. A reset gate line 702 controls the reset switch 701. The pixel arrangement of this embodiment is applicable to the first to third embodiments. With this pixel arrangement, as compared with the first to third embodiments, the reset voltage of the photoelectric conversion element 1 can be accurately controlled. DC level variations of the signal voltages produced by reset voltage variations, and any after image produced by the reset voltage remaining upon irradiation of strong light can be reduced. In particular, when this arrangement is applied to the third embodiment described above, power supply terminals 5 are alternately located in the vertically opposite directions in units of columns or in units of a plurality of columns, thereby greatly reducing signal voltage shading.

FIG. 8 is a diagram for explaining the fifth embodiment of the present invention. Referring to FIG. 8, a charge transfer switch 801 perfectly depletes and transfers the signal charge from a photoelectric conversion element 1 to a source follower input MOS 2. A transfer gate line 802 controls the transfer switch 801. In general, to increase the sensitivity of the photoelectric conversion apparatus, the size of the photoelectric conversion element 1 is increased and the conversion amount is increased in converting an optical signal into an electrical signal. The parasitic capacitance value of the gate of the source follower input MOS 2 increases accordingly, the read rate lowers, and the sensitivity cannot efficiently increase. With the arrangement of this embodiment, however, the capacitance value of the input gate of the source follower input MOS 2 is designed to be smaller than that of the photoelectric conversion element 1 (e.g., a photodiode), and perfect depletion transfer is performed to increase the sensitivity.

As shown in FIG. 8, a vertical selection switch MOS 3 is inserted between a power supply line 4 and the source follower input MOS 2, and the voltage drop accounted for by the resistance of the vertical selection switch MOS 3:

$$Ia \times Rm \tag{12}$$

in equation (2) can be eliminated, thereby obtaining a wide dynamic range.

The pixel arrangement of this embodiment can be applied to the first to third embodiments to obtain the same effect as described above.

In the first to fifth embodiments, the same effect can be obtained regardless of the NMOS or PMOS transistor. The above embodiments can be combined to further reduce or prevent occurrence of shading. For example, when the case in which different power supply terminals located at two terminals of the power supply lines shown in the third embodiment is combined with the case in which the horizontal output lines 11 are located at two terminals of the horizontal output lines 11 as shown in the second embodiment, both shading attributed to the resistance of the vertical output line and shading attributed to the resistance of the power supply line can be eliminated.

The present invention is not limited to the pixel structures shown in the first to fifth embodiments. For example, an arrangement in which the charge accumulated in the photoelectric conversion element is not amplified before being output, i.e., the charge is output without amplification can be employed. The transistor is not limited to the MOS element, but can be an SIT or BASIS element.

As has been described above, according to the first to fifth embodiments, vertical shading of the output signals from the photoelectric conversion apparatus can be reduced.

In addition, vertical saturation voltage shading of the output signal from the photoelectric conversion apparatus can also be reduced, and the dynamic range of the output from each photoelectric conversion element can be widened.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image pickup apparatus comprising:
   a photoelectric conversion area in which a plurality of pixels are two-dimensionally arranged in horizontal and vertical directions, wherein each of said of plurality of pixels includes a photoelectric conversion element and an amplification element which amplifies a signal from said photoelectric conversion element to output the amplified signal;

a plurality of first vertical output lines which output sequentially signals from the pixels arranged in the vertical direction;

a plurality of second vertical output lines which output sequentially signals from the pixels arranged in the vertical direction;

a first horizontal output line which outputs sequentially the signals from said plurality of first vertical output lines;

a second horizontal output line which outputs sequentially the signals outputted from said plurality of second vertical output lines, wherein said first horizontal output line is arranged on a side of a first side of said photoelectric conversion area, said second horizontal output line is arranged on a side of a second side of said photoelectric conversion area, and said first side and said second side of said photoelectric conversion area are opposite to each other in the vertical direction;

a plurality of first load elements, wherein at least one first load element is arranged to fix a direction of current flowing through each of said plurality of first vertical output lines; and a plurality of second load elements, wherein at least one second load element is arranged to fix a direction of current flowing through each of said plurality of second vertical output lines, and wherein said plurality of first load elements and said plurality of second load elements are arranged on sides opposite to each other with respect to said photoelectric conversion area.

2. An apparatus according to claim 1, wherein said plurality of first vertical output lines and said plurality of second vertical output lines are arranged alternately.

3. An apparatus according to claim 1, further comprising an addition circuit which adds to each other the signals from a plurality of the pixels adjacent to each other.

4. An apparatus according to claim 1, wherein the amplification element and the first load element construct a source follower, and the amplification element and the second load element constitute a source follower circuit.

5. An apparatus according to claim 1, wherein said plurality of first load elements are arranged between said photoelectric conversion area and said first horizontal output line, and said plurality of second load elements are arranged between said photoelectric conversion area and said second horizontal output line.

* * * * *

UNITED STATES PATENT AND TRADEMARK OFFICE
CERTIFICATE OF CORRECTION

PATENT NO. : 7,221,397 B1
APPLICATION NO. : 09/161294
DATED : May 22, 2007
INVENTOR(S) : Tetsunobu Kochi It is certified that error appears in the above-identified patent and that said Letters Patent is hereby corrected as shown below:

ON TITLE PAGE, ITEM (56) FOREIGN PATENT DOCUMENTS

"JP 04-010569 1/1992" should be deleted (duplicate); and
"JP 9-51480 2/1997" should be deleted (duplicate).

ON TITLE PAGE, ITEM (56) OTHER PUBLICATIONS

Insert: --Patent Abstracts of Japan, vol. 1997, No. 06, June 30, 1997, JP 09 051480 A (Abstract)--.

COLUMN 2

Line 9, "$Vsig1 = Vsig0 - Vth0 - Ia \times Rm - Ia \times r1 \times K (1 \leq K > M)$" should read --$Vsig1 = Vsig0 - Vth0 - Ia \times Rm - Ia \times r1 \times K (1 \leq K \leq M)$--.

COLUMN 6

Line 13, "induces" should read --induced--.

COLUMN 10

Line 66, "said of" should read --said--.

Signed and Sealed this

Fifteenth Day of April, 2008

JON W. DUDAS
*Director of the United States Patent and Trademark Office*